Aug. 6, 1968   H. A. CLEMENTS   3,395,782
SYNCHRONOUS SELF-SHIFTING CLUTCHES
Filed March 4, 1966   2 Sheets-Sheet 2

United States Patent Office 3,395,782
Patented Aug. 6, 1968

3,395,782
SYNCHRONOUS SELF-SHIFTING CLUTCHES
Herbert Arthur Clements, Oatlands Park, Weybridge, Surrey, England, assignor to S.S.S. Patents Limited, London, England
Filed Mar. 4, 1966, Ser. No. 531,801
Claims priority, application Great Britain, Apr. 5, 1965, 14,391/65
6 Claims. (Cl. 192—67)

ABSTRACT OF THE DISCLOSURE

A synchronous self-shifting clutch wherein clutch engagement and disengagement involve helical movement of an intermediate member relative to one of the clutch members, and wherein the movement of the intermediate member in at least one direction is damped by a dashpot which includes a piston structure movable with the intermediate member. In order to prevent reduction of the damping action by the expulsion of liquid from the dashpot through its feed duct, the duct is blanked by a surface on the piston structure during at least part of the movement of the intermediate member.

Figure 1:
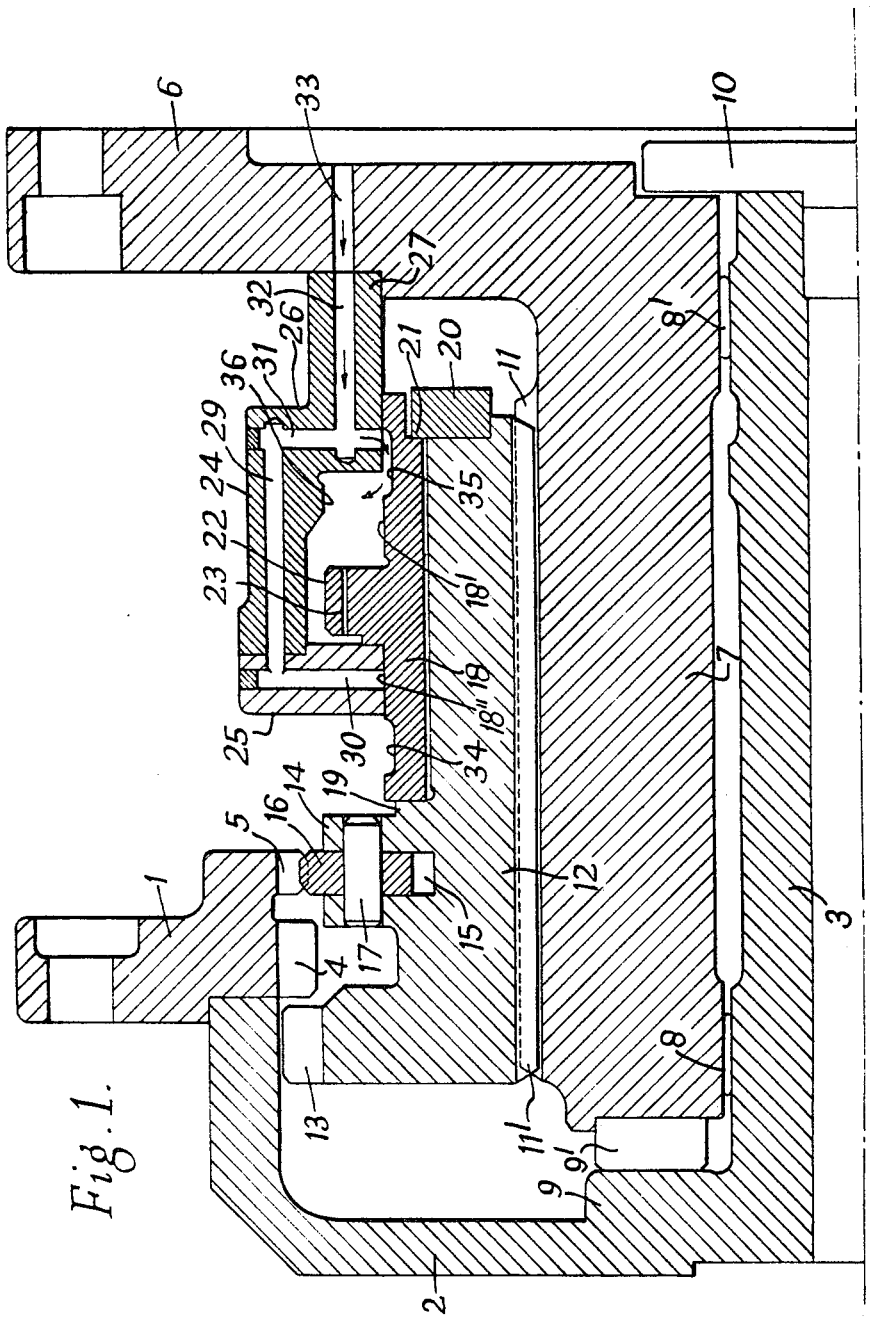

This invention relates to synchronous self-shifting toothed clutches of the type comprising an input clutch member and an output clutch member, and clutch actuating mechanism operative upon passage of the said clutch members through rotational synchronism, said mechanism including an intermediate member movable helically relative to one of said clutch members to effect at least initial interengagement of the co-acting clutch teeth.

Co-pending patent application No. 264,630 now Pat. No. 3,203,526 relates to a synchronous self-shifting clutch of the type referred to wherein a dash-pot is provided for damping the movement of the intermediate member, the dash-pot comprising a piston and an associated cylinder which is substantially closed on one side of the piston and has a liquid feed duct to the other side of the piston, a leakage path being provided through and/or around the piston to permit liquid to flow at a restricted rate from one side of the piston to the other upon relative axial movement of the piston and cylinder, so that upon movement of the intermediate member in one direction liquid is transferred from one side of the piston to the other side to give a powerful damping action, and liquid is largely retained in the cylinder on the said other side of the piston to damp movement of the intermediate member in the other direction.

In the embodiments illustrated in the drawings accompanying the said co-pending application No. 264,630 the cylinder is substantially closed on one side of the piston such that a powerful damping action is exerted by the dashpot on the movement of the intermediate member in the direction to engage the clutch, and the damping action exerted on the intermediate member during its movement in the direction to disengage the clutch will be less powerful since some of the liquid on the said other side of the piston will be expelled through ducts of relatively small area against the pressure of the liquid in the feed duct, consequent upon the relative movement of the piston and cylinder. It has however been found desirable in some cases for a powerful damping action also to be exerted on the intermediate member during its movement in the clutch-disengaging direction.

In accordance with the present invention there is provided a synchronous self-shifting toothed clutch of the type comprising an input clutch member and an output clutch member, and clutch actuating mechanism operative upon passage of the said clutch members through rotational synchronism, said mechanism including an intermediate member movable helically relative to one of said clutch members to effect at least initial interengagement of the coacting clutch teeth, the clutch having a dashpot comprising a cylinder and piston for damping the movement of the intermediate member, wherein at least one feed duct is provided for supplying liquid to the dashpot cylinder, and closing means are provided for substantially closing said duct during at least a part of the movement of the intermediate member between a first position corresponding to disengagement of the clutch teeth and a second position corresponding to engagement of the clutch teeth.

Figure 2:
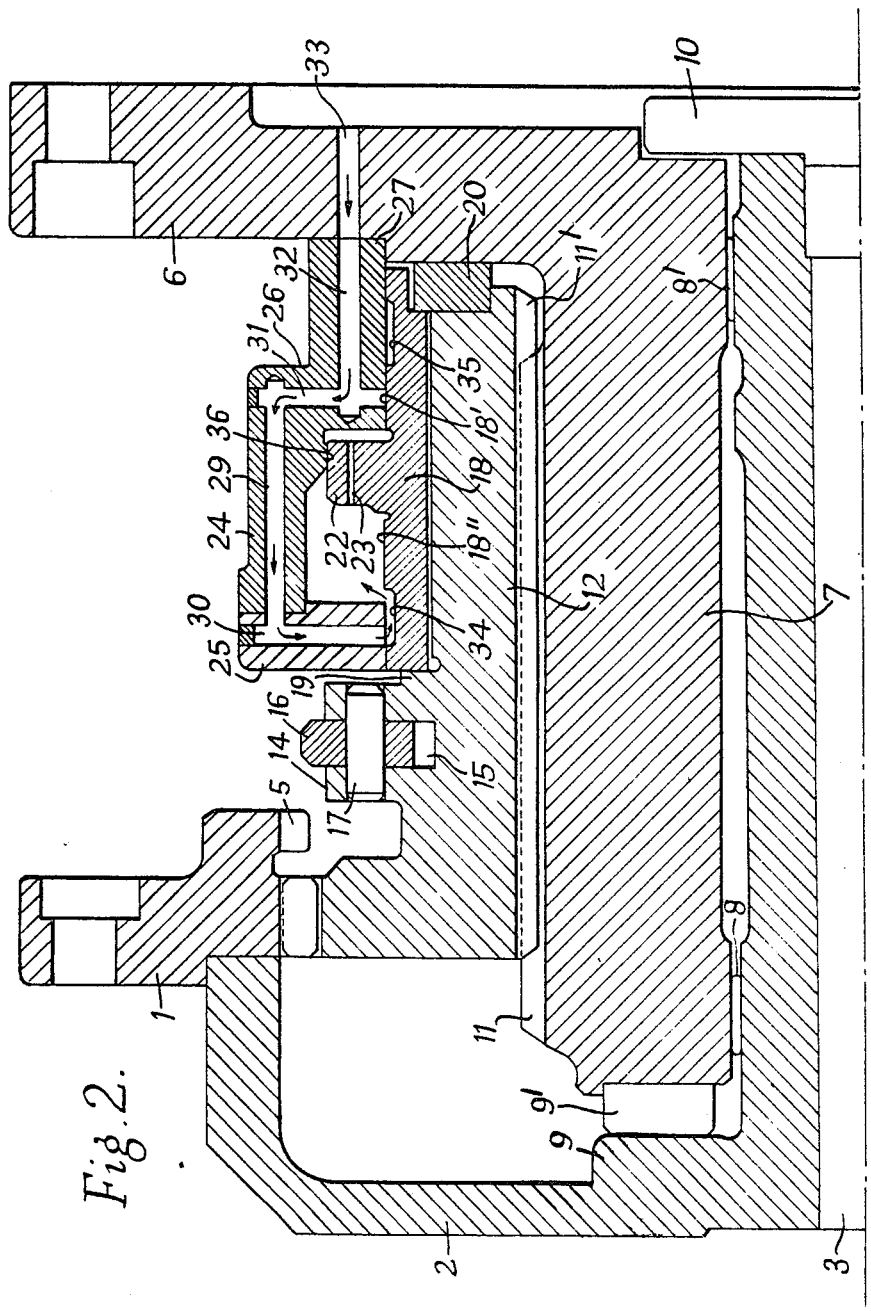

In the accompanying drawings,

FIG. 1 is a view in axial half-section of a clutch embodying the invention, showing the clutch disengaged, and FIG. 2 is a similar view showing the clutch engaged.

As seen in the drawings, the input member of the clutch illustrated is a ring 1 fixed to a flange 2 on the left hand end of a shaft 3, the ring 1 being formed with a ring of internal clutch teeth 4 and a ring of internal ratchet teeth 5. The output member of the clutch is a flange 6 on the right hand end of a hollow shaft 7 within which the shaft 3 is journalled via bearings 8, 8' axial movement of the shaft 3 relative to the shaft 7 being prevented by an annular boss 9 formed on the left hand end of the shaft 3 in sliding contact with a bearing ring 9' on the shaft 7, and a disc 10 carried on the right hand end of the shaft 3 in sliding contact with the associated end of the shaft 7. The shaft 7 is formed with external right hand helical splines 11 with which are engaged internal helical splines 11' in an intermediate member or clutch sleeve 12 formed with a ring of external clutch teeth 13 and with an annular flange 14 formed with a groove 15 in which are accommodated spring controlled pawls, one of which is shown at 16, mounted on pawl pins, one of which is shown at 17.

The clutch sleeve 12 is formed with external axial splines with which engage internal splines in a piston structure comprising a sleeve 18, which is fixed against axial movement relative to the clutch sleeve 12 by its engagement on the left hand end with a shoulder 19 of the clutch sleeve 12 and by a ring 20 fixed to the right hand end of the clutch sleeve 12 and engaging a shoulder 21 of the sleeve 18. The piston structure also comprises a radially outwardly projecting annular flange 22 on the sleeve 18, which flange as will be described serves as a dashpot piston. A plurality of restricted axial passages, one of which is shown at 23, are formed in the piston 22. The cylinder of the dashpot is formed by an annular member comprising a cylindrical body 24, a radially inwardly directed annular flange 25 the radially inner surface of which is in sliding contact with a surface 18″ of the sleeve 18 on the left hand side of the piston 22, and a radially inwardly directed annular flange 26, the radially inner surface of which is in sliding contact with a surface 18′ of the sleeve 18 on the right hand side of the piston 22. The flange 26 is solid with a ring 27 fixed to the flange 6.

The cylindrical body 24 of the dashpot cylinder is formed with an axial duct 29 which communicates at its left hand end with a radial duct 30 in the flange 25 and at its right hand end with a radial duct 31 formed in the flange 26 and communicating with aligned axial ducts 32 and 33 in the ring 27 and flange 6 respectively, the ducts 33 being connectible to an oil supply, not shown, which may for example be a pump. The sleeve 18 is formed with external annular grooves 34 and 35.

Over the major part of its length the inner surface of the cylindrical body 24 has a radius such that there is an annular gap between the said surface and the cylindrical outer surface of the piston 22, but at its right hand end the radius is reduced so that the part 36 of the surface is capable of sliding contact with the outer surface of the piston 22.

The operation of the clutch is as follows.

As seen from the right hand end of the clutch in the figures, the noses of the pawls 16 point in the clockwise direction, so that with the ring 1 rotating in the clockwise direction relative to the flange 6 the clutch is disengaged (FIG. 1) and the ratchet teeth 5 ratchet relative to the pawls. When the direction of relative rotation of the ring 1 and flange 6 tends to reverse, pawls 16 engage ratchet teeth 5, and the clutch sleeve 12 is shifted helically to the right relative to the shaft 7, bringing its clutch teeth 13 into precise initial interengagement with the clutch teeth 4. Thereupon the interaction of the clutch teeth 4 and 13 draws the clutch sleeve 12 into full toothed engagement with the ring 1, with the ring 20 in contact with the flange 6 (FIG. 2).

When the clutch is in the disengaged condition (FIG. 1) the groove 34 is to the left of the flange 25 and the duct 30 in this flange is blanked off by the engagement of the radially inner surface of the flange with the surface 18″ of the sleeve 18. The groove 35, however, is in communication with the duct 31 in the flange 26, so that oil from the duct 33 can flow into the dashpot chamber as shown by the arrows in FIG. 1. During the helical movement of the clutch sleeve 12 to the right from the position shown in FIG. 1 the piston 22 moves with it to the right relative to the dashpot cylinder 24, 25, 26. The initial part of this movement of the piston 22 takes place without much restraint from the oil in the dashpot cylinder since the piston 22 is surrounded by the part of the cylinder of relatively large internal radius and oil on the right hand side of the piston 22 can transfer to the left hand side of the piston via the annular space around the piston as well as through the ducts 23 therein. When the piston 22 has moved through rather more than half its travel to the right the outer surface of the piston comes into sliding contact with the surface 36, of smaller internal radius, of the dashpot cylinder so that oil on the right hand side of the piston can no longer pass to the left hand side thereof, around the piston, being able to do so only via the ducts 23. Because of the resistance to the passage of oil through the ducts 23 due to their being relatively narrow, there would be a tendency for oil to be expelled from the right hand side of the piston through the feed ducts 31, 32 and 33, but such expulsion is prevented by the blanking off of the duct 31 by the surface 18′ of the sleeve 18. During the further movement of the clutch sleeve 12 to the right the duct 31 remains closed (FIG. 2).

During the movement of the clutch sleeve 12 to the right, and after the duct 31 has been closed, the groove 34 establishes communication between the duct 30 and the left hand side of the piston (FIG. 2). When the clutch sleeve 12 has reached the limit of its travel to the right, the dashpot cylinder is already charged with oil on the left hand side of the piston, this oil having been transferred from the right hand side of the piston, and any leakage losses are made good by oil supplied via the ducts 33, 32, 31, 29 and 30 as shown by the arrows in FIG. 2.

When the ring 1 rotates in counterclockwise direction, as seen from the left hand end in the drawings, relative to the flange 6 the interaction of the clutch teeth 4 and 13 causes the clutch to disengage, the clutch sleeve 12 moving helically to the left relative to the shaft 7 from the position shown in FIG. 2, to the position shown in FIG. 1. The piston 22 also moves to the left relative to the dashpot cylinder, and there will be a tendency for oil at the left hand side of the piston to be expelled via the ducts 30, 29, 31, 32 and 33. However, after the clutch sleeve 12 has moved a short distance to the left the duct 30 is blanked off by the surface 18″, and since the piston 22 is still surrounded by the surface 36 the oil on the left hand side of the piston can transfer to the right hand side thereof only via the restricted ducts 23 in the piston, and the movement of the clutch sleeve 12 to the left is subjected to a powerful damping action. This damping action continues until the piston 22 has moved away from the surface 36, whereupon the oil can transfer from the left hand side of the piston to the right hand side thereof via the annular passage around the piston, as well as via the ducts 23.

I claim:

1. A synchronous self-shifting toothed clutch of the type comprising an input clutch member and an output clutch member, and clutch actuating mechanism operative upon passage of the said clutch members through rotational synchronism, said mechanism including an intermediate member movable helically relative to one of said clutch members to effect at least initial interengagement of the coacting clutch teeth, the clutch having a dashpot comprising a cylinder and piston structure for damping the movement of the intermediate member, wherein at least one feed duct is provided for supplying damping liquid to the dashpot cylinder, the improvement residing in the feature that a surface on said piston structure is positioned so as substantially to close said duct during at least a part of the movement of the intermediate member between a first position corresponding to disengagement of the clutch teeth and a second position corresponding to engagement of the clutch teeth.

2. A synchronous self-shifting toothed clutch according to claim 1 wherein said feed duct is arranged for feeding liquid to the cylinder on that side of the piston from which liquid tends to be expelled from the cylinder during movement of the intermediate member from said first to said second position, and said surface is positioned so as substantially to close said duct during at least a final part of said movement.

3. A synchronous self-shifting toothed clutch according to claim 1 wherein said feed duct is arranged for feeding liquid to the cylinder on that side of the piston from which liquid tends to be expelled from the cylinder during movement of the intermediate member from said second position to said first position, and said surface is positioned so as substantially to close said duct during at least an initial part of said movement.

4. A synchronous self-shifting toothed clutch according to claim 1 having a first feed duct arranged for feeding liquid to the cylinder or that side of the piston from which liquid tends to be expelled from the cylinder during movement of the intermediate member from said first position to said second position, said surface being positioned so as to be effective substantially to close said first duct during at least a final part of said movement, a second feed duct arranged for feeding liquid to the cylinder on that side of the piston from which liquid tends to be expelled during movement of the intermediate member from said second to said first position, and a further surface on said structure positioned so as to be effective substantially to close said second duct during at least an initial part of said last-mentioned movement.

5. A synchronous self-shifting toothed clutch according to claim 4 wherein said first and second ducts are provided in the respective end walls of the cylinder and are interconnected by at least one duct in the body of the cylinder, and a further duct is provided which communicates with said previously mentioned ducts and is connectible to a source of liquid pressure.

6. A synchronous self-shifting toothed clutch according to claim 5 wherein the piston structure is formed with a first groove via which said first duct communicates with the interior of the cylinder when the intermediate member is in said first position, and the piston structure is formed with a second groove via which said second duct communicates with the interior of the cylinder when the intermediate member is in said second position.

References Cited
UNITED STATES PATENTS 3,154,181   10/1964   Sigg _____ 192—67

FRED C. MATTERN, Jr., *Primary Examiner.*

A. T. McKEON, *Assistant Examiner.*